Sept. 1, 1936.  F. L. BISHOP ET AL  2,052,545
APPARATUS FOR THE MANUFACTURE OF LAMINATED GLASS
Filed May 6, 1933  4 Sheets-Sheet 2

Sept. 1, 1936.  F. L. BISHOP ET AL  2,052,545
APPARATUS FOR THE MANUFACTURE OF LAMINATED GLASS
Filed May 6, 1933   4 Sheets-Sheet 3

INVENTORS

Sept. 1, 1936.  F. L. BISHOP ET AL  2,052,545

APPARATUS FOR THE MANUFACTURE OF LAMINATED GLASS

Filed May 6, 1933  4 Sheets-Sheet 4

Patented Sept. 1, 1936

2,052,545

UNITED STATES PATENT OFFICE 2,052,545

APPARATUS FOR THE MANUFACTURE OF LAMINATED GLASS

Frederic L. Bishop, Fox Chapel Manor, Charles S. Shoemaker, Jeannette, Lonnie J. Pierce, Pittsburgh, and Charles F. Wood and Edlo Donnini, Jeannette, Pa., assignors to American Window Glass Company, Pittsburgh, Pa., a corporation of Pennsylvania Application May 6, 1933, Serial No. 669,740

6 Claims. (Cl. 34—12)

This invention relates to apparatus for the manufacture of laminated glass and more particularly to heating or drying apparatus for preparing the sheets before they are assembled into a sandwich.

It has been proposed to manufacture laminated or strengthened glass, consisting of two sheets of glass and an interposed layer of a strengthening material all rigidly united together, by forming a film or coating of a solution of a strengthening material on the glass sheets to be united, drying the coatings on the glass sheets and thereafter rigidly uniting the sheets with the coated surfaces in juxtaposed relationship.

In the copending application of Frederic L. Bishop, and Charles S. Shoemaker, Serial No. 658,598, filed February 25, 1933, there is shown and described a method of manufacturing laminated glass wherein a solution of a strengthening material is flowed on the glass sheets and the sandwich formed in the manner above described. Reference is hereby made to said application for a complete description of a process wherein a liquid strengthening material is used. The present invention is concerned only with novel apparatus for drying the coatings on the glass sheets and the resulting product.

In carrying out the drying of the coatings, it is desirable that the drying be uniform and that the solvent liberated from the coatings during the drying operation be immediately removed from adjacent the glass sheets. If it is not, the drying will not be uniform and a streaked and otherwise unsatisfactory product will result. It is also desirable to heat the coated glass sheets at increasingly greater temperatures as the sheets progress through the heating chamber. Further desirable results can be accomplished by passing the air for carrying away the solvents liberated from the coatings on the glass sheets over the glass sheets in a vertically extending direction. This is particularly true where the solvent for the strengthening material is heavier than air, which is the case where either dibutyl phthalate or diethyl chloride is used as the solvent for the strengthening material.

By our invention we provide apparatus for accomplishing the above mentioned highly desirable results in the drying of the coatings on the glass sheets. The apparatus which we provide, a preferred embodiment of which is shown in the accompanying drawings, is particularly suitable for removing a solvent, or other liquid in the coatings on the glass sheets, which is heavier than air. It will be understood, however, that our invention is not limited to the removal of a heavier-than-air solvent and that the apparatus which we provide may be used in drying surfaces of any character whatever.

In the accompanying drawings, we have shown for purposes of illustration only, a preferred embodiment of our invention. It will be understood, however, that we do not intend to be limited thereby, and that the invention may be otherwise embodied within the scope of the accompanying claims.

In the drawings,

Figure 4 is a plan view of a portion of the charging end of the chamber, partially broken away to show the interior plan of the drying chamber;

Figure 5 is a sectional view through a portion of the conveying mechanism and showing a portion of a glass sheet mounted thereon; and Figure 6 is a diagrammatic view showing three heating or drying conveyors in a suitable room.

Figure 1:
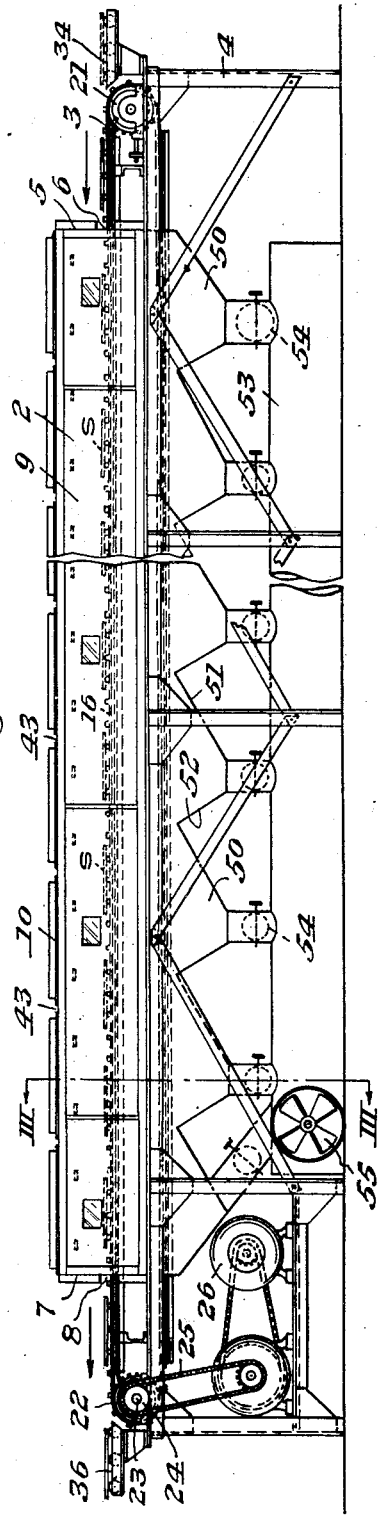
Figure 1 is a side elevational view of the apparatus which we provide.
Figure 2:
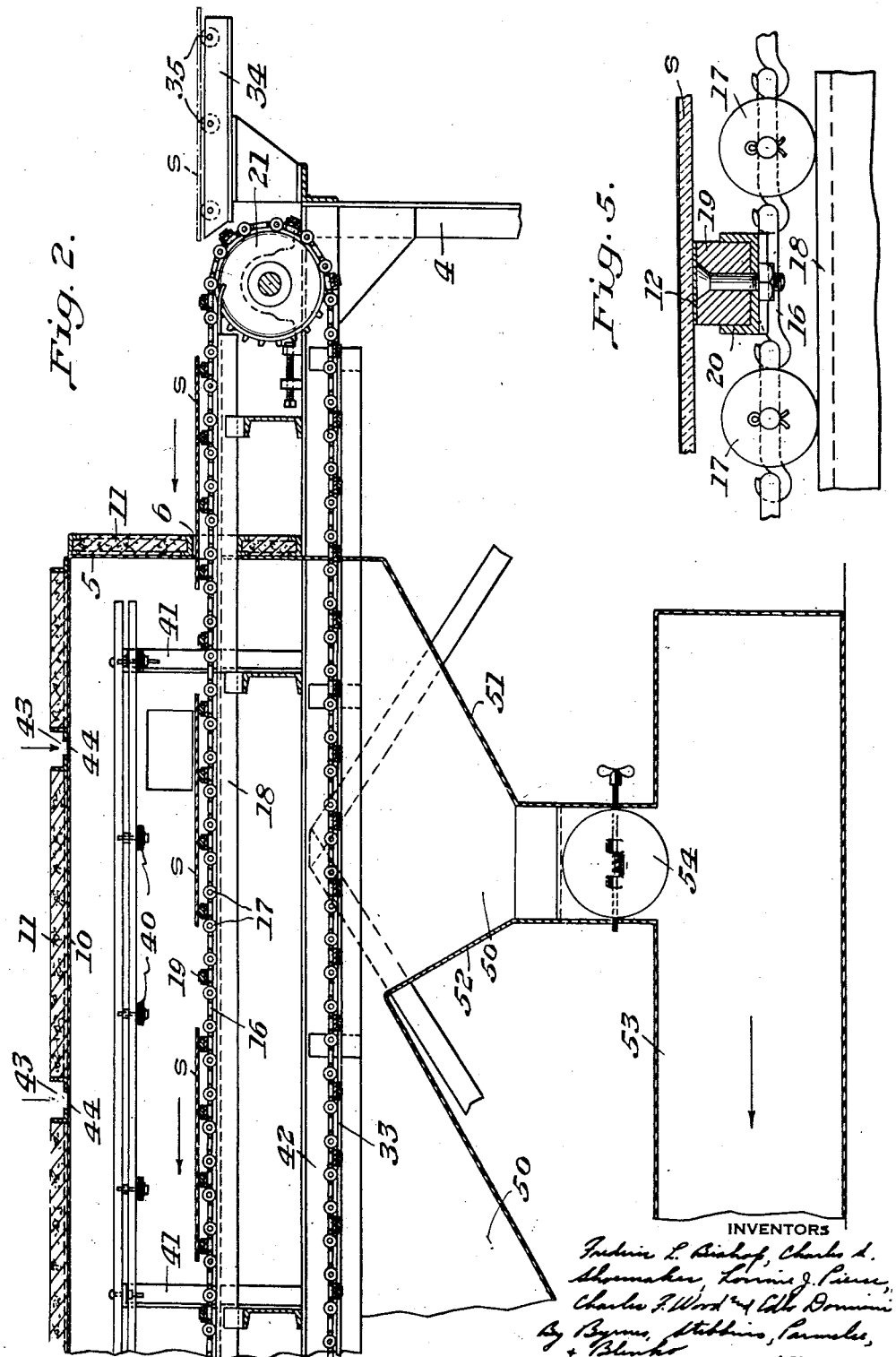
Figure 2 is a longitudinal sectional view through the charging end of the apparatus shown in Figure 1.
Figure 3:
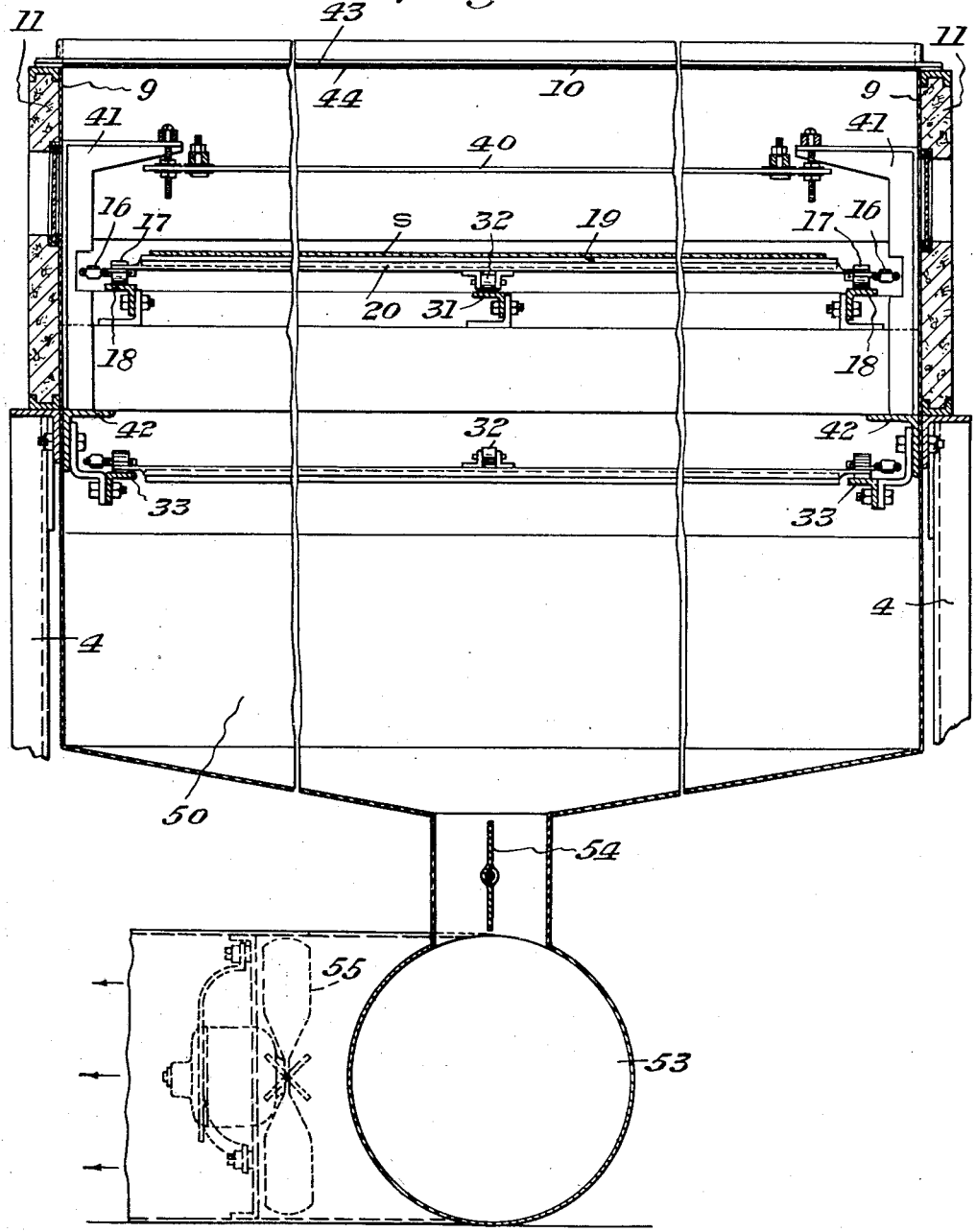
Figure 3 is a sectional view taken along the line III—III of Figure 1.

As shown in the drawings, the apparatus which we provide comprises a heating or drying chamber 2 and a conveying mechanism indicated generally by the reference character 3 mounted on a suitable frame indicated generally by the reference character 4. The heating chamber 2 comprises an end wall 5 having a charging opening 6 therein, which is sufficiently large to admit the conveying mechanism, a discharge end wall 7 having a discharge opening 8 therein which is also sufficiently large to permit the conveying mechanism to pass therethrough, side walls 9 and a top wall 10. The side, end and top walls are provided with suitable insulating material 11 to insulate the chamber formed thereby against excessive heat losses.

The conveying mechanism shown in the drawings is of the continuous chain type and comprises spaced chains 16 located adjacent each side wall of the furnace. Each chain 16 is provided with a plurality of wheels 17 adapted to run on tracks 18. The tracks 18 are made up of a plurality of angle irons suitably mounted in the heating chamber adjacent each side thereof. The chains 16 carry supporting strips 19 mounted in channels 20 on the chains. These supporting strips 19 extend transversely of the furnace and are spaced apart and carry the glass sheets or other articles being passed through the furnace. They are each preferably faced with a facing strip 12 of suitable material to prevent marking of the glass sheets S.

The conveying mechanism, as stated above, is of the continuous chain type and is provided with sprocket wheels 21 adjacent the charging end of the furnace which wheels are adapted to cooperate with the chains, and is also provided with sprocket wheels 22 adjacent the discharge end of the chamber. The sprocket wheels 22 are mounted on a shaft 23 which also carries a second sprocket wheel 24 adapted to be driven by a chain 25 which, in turn, is driven by a motor 26 through suitable chain and speed reducing mechanism.

A track 31 is provided intermediate the sides of the heating chamber which track is adapted to cooperate with wheels 32 carried by the supporting strips 19. An intermediate track of this character may or may not be used as the supporting strips 19 are sufficiently rigid to remain unflexed when carrying the ordinary load.

The heating chamber is provided with additional tracks 33 carried by the side walls, and are so located as to cooperate with the wheels 17 during the return stroke of the conveyor chains.

A roll table 34 is provided adjacent the charging end of the conveyor mechanism for facilitating the placing of the glass sheets to be dried on the conveying mechanism. The roll table 34 is provided with a plurality of rollers 35 which are spaced transversely a sufficient distance to permit the operator's hands to enter therebetween in placing a sheet of glass thereon. A similar roll table 36 is provided at the discharge end of the drier for facilitating removal of the glass sheets from the conveying mechanism.

Heat is supplied to the heating or drying chamber by means of a plurality of transversely extending electrical resistance units 40 spaced longitudinally of the furnace above the level of the conveying mechanism. Suitable electric connections, not shown, are provided for supplying the necessary heating current to these heating units. Each heating unit 40 is suitably mounted on brackets 41 carried by angle irons 42 mounted on the side walls of the drier. Screens or baffles may be provided immediately below the heating units to prevent overheating therebelow.

Air is supplied to the heating chamber through a plurality of spaced openings 43 located in the roof of the chamber. Each opening 43 is provided with a fine mesh screen 44 to prevent dirt or other impurities in the air from passing into the heating chamber.

The bottom of the heating or drying chamber is made up of a plurality of troughs 50 made out of sheet metal or any other suitable material. The troughs 50 have transversely extending inclined sides 51 and 52, the angle of inclination of the side walls 51 being less than the angle of inclination of the side walls 52. The troughs 50 are spaced longitudinally of the drier and are for the purpose of carrying away air carrying the solvent or other volatiles liberated from the coatings on the glass sheets S being transported through the heating chamber by the conveyor.

Each trough 50 communicates with a common header 53 which extends longitudinally of the drier and which is adapted to carry away the air and volatiles liberated from the coated glass sheets. A valve or damper 54 is provided between each trough and the common header 53 for the purpose of permitting individual regulation of the flow of air and volatiles downwardly through each of the troughs.

An exhausting fan 55 is provided adjacent one end of the common header. This exhausting fan draws the air and volatiles through the drier and may be driven at such speed as to create a subatmospheric pressure in the heating chamber. A subatmospheric pressure of approximately 1 millimeter of water in the drying chamber has been found to be highly desirable.

As can be seen from the above description of the apparatus which we provide, the coated glass sheets to be dried are carried through the heating chamber by means of the conveying mechanism. Air enters the drying or heating chamber through openings in the heating chamber, the openings being located above the level of the conveying mechanism. The air is heated by the heating elements which are also located above the conveyor level. The heated air then passes downwardly through the drying chamber and around the edges of the coated glass sheets and carries with it the solvent or other volatiles liberated from the coatings on the glass sheets. It will be understood, of course, that a portion of the air will flow transversely across the sheets and effect a wiping action on the sheets due to the motion of the sheets and thereby remove the solvent and other volatiles. The air and the volatiles then pass downwardly into the transverse troughs and are carried away by the main header 53 and the exhauster 55.

By the use of apparatus of the above character in the manner herein described, we obtain a new article of manufacture, namely, a sheet of glass having a coating dried thereon, which coating is substantially free of distortion. All attempts to obtain such a product have heretofore been unsuccessful.

It has been found desirable to subject the coated glass sheets to air at increasingly greater temperatures as the sheets progress through the chamber. Accordingly, the heating elements are so arranged as to provide a temperature of approximately 70° adjacent the charging end of the drier and a temperature of approximately 190° F. adjacent the discharge end.

In Figure 6 we have shown a suitable room for housing the drying mechanism. The room 60 is of ordinary construction except that it is provided with a door 61 leading into an intermediate chamber 62 and a second door 63 leading therefrom into the room. The purpose of this double door arrangement is to provide a dust free atmosphere within which to carry out the drying operation and to provide a room which may, if desired, be maintained at a subatmospheric pressure. Where a room of this character is provided which may be maintained at a subatmospheric pressure, it is unnecessary to so operate the exhauster 55 as to maintain a subatmospheric pressure only in the drying chamber.

While we have shown and described a preferred embodiment of our invention, it will be understood that we do not intend to be limited thereby, as the structure shown can be altered in many respects without departing from the spirit and scope of our invention.

We claim:

1. Apparatus for the manufacture of laminated glass comprising an enclosed heating chamber, a continuous conveyor for conveying materials therethrough in a substantially horizontal position, a plurality of transversely extending heating units rigidly mounted in said chamber above the level of said conveying means, said heating units being spaced longitudinally of said heating chamber, a plurality of transversely extending air inlets in the top wall of said heating chamber and above said heating units, said inlets being spaced longitudinally of the heating chamber, and means for removing gases from within said heating chamber at a point below the level of said conveying means.

2. Apparatus for the manufacture of laminated glass comprising an enclosed heating chamber, a continuous conveyor for conveying materials therethrough in a substantially horizontal position, a plurality of transversely extending heating units rigidly mounted in said chamber above the level of said conveying means, said heating units being spaced longitudinally of said heating chamber, a plurality of transversely extending air inlets in the top wall of said heating chamber and above said heating units, said inlets being spaced longitudinally of the heating chamber, and means for removing gases from within said heating chamber at a point below the level of said conveying means, including a plurality of transversely extending troughs spaced longitudinally of the heating chamber.

3. Apparatus for the manufacture of laminated glass comprising an enclosed heating chamber, a continuous conveyor for conveying materials therethrough in a substantially horizontal position, a plurality of transversely extending heating units rigidly mounted in said chamber above the level of said conveying means, said heating units being spaced longitudinally of said heating chamber, a plurality of transversely extending air inlets in the top wall of said heating chamber and above said heating units, said inlets being spaced longitudinally of the heating chamber, means for removing gases from within said heating chamber at a point below the level of said conveying means, including a plurality of transversely extending troughs spaced longitudinally of the heating chamber, and a common header having exhausting means cooperating therewith for simultaneously exhausting gases throughout the length of the heating chamber through said troughs.

4. Apparatus for the manufacture of laminated glass comprising an enclosed heating chamber, a continuous conveyor for conveying materials therethrough in a substantially horizontal position, a plurality of transversely extending heating units rigidly mounted in said chamber above the level of said conveying means, said heating units being spaced longitudinally of said heating chamber, a plurality of transversely extending air inlets in the top wall of said heating chamber and above said heating units, said inlets being spaced longitudinally of the heating chamber, means for removing gases from within said heating chamber at a point below the level of said conveying means, including a plurality of transversely extending troughs spaced longitudinally of the heating chamber, a common header having exhausting means cooperating therewith for simultaneously exhausting gases throughout the length of the heating chamber through said troughs, and a valve in each of said troughs for controlling the rate of exhaust therethrough.

5. Apparatus for the manufacture of laminated glass comprising an enclosed heating chamber, a continuous conveyor for conveying materials therethrough in a substantially horizontal position, a plurality of transversely extending heating units rigidly mounted in said chamber above the level of said conveying means, said heating units being spaced longitudinally of said heating chamber, a plurality of transversely extending air inlets in the top wall of said heating chamber and above said heating units, said inlets being spaced longitudinally of the heating chamber, and means for removing gases from within said heating chamber at a point below the level of said conveying means, including a plurality of transversely extending troughs spaced longitudinally of the heating chamber, the forward and rear walls of each of said transversely extending troughs having different angles of inclination to the horizontal.

6. Apparatus for the manufacture of laminated glass comprising an enclosed heating chamber, a continuous conveyor for conveying materials therethrough in a substantially horizontal position, a plurality of transversely extending heating units rigidly mounted in said chamber above the level of said conveying means, said heating units being spaced longitudinally of said heating chamber, a plurality of transversely extending air inlets in the top wall of said heating chamber and above said heating units, said inlets being spaced longitudinally of the heating chamber, and means for removing gases from within said heating chamber at a point below the level of said conveying means, including a plurality of transversely extending troughs spaced longitudinally of the heating chamber, the wall of each of said troughs closest the charging end of said heating chamber having a lesser angle of inclination than the wall thereof closest the discharge end of the heating chamber.

FREDERIC L. BISHOP.
CHARLES S. SHOEMAKER.
LONNIE J. PIERCE.
CHARLES F. WOOD.
EDLO DONNINI.